March 17, 1931. V. F. HITT ET AL 1,797,144
OPENING AND CLOSING DEVICE FOR RUMBLE SEATS
Filed Feb. 1, 1930    2 Sheets-Sheet 1
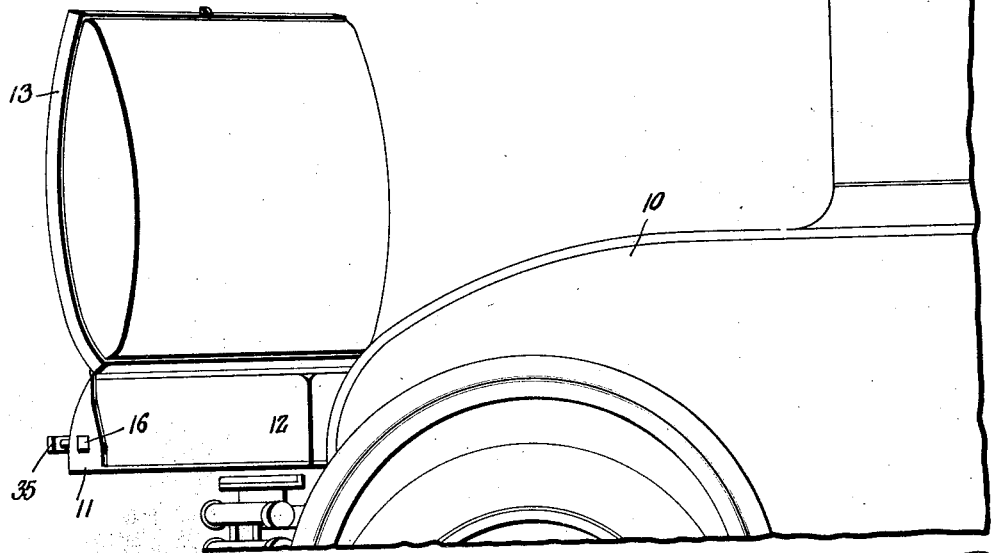
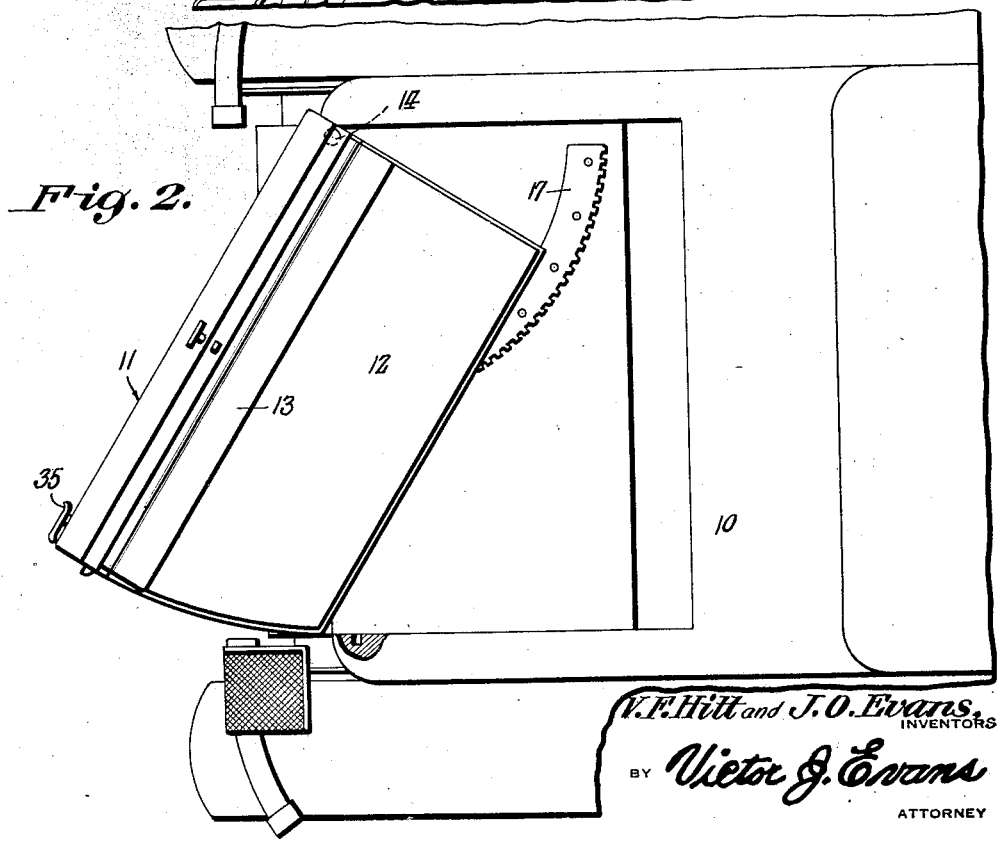
V.F.Hitt and J.O.Evans, INVENTORS
BY Victor J. Evans
ATTORNEY March 17, 1931. V. F. HITT ET AL 1,797,144
OPENING AND CLOSING DEVICE FOR RUMBLE SEATS
Filed Feb. 1, 1930 2 Sheets-Sheet 2
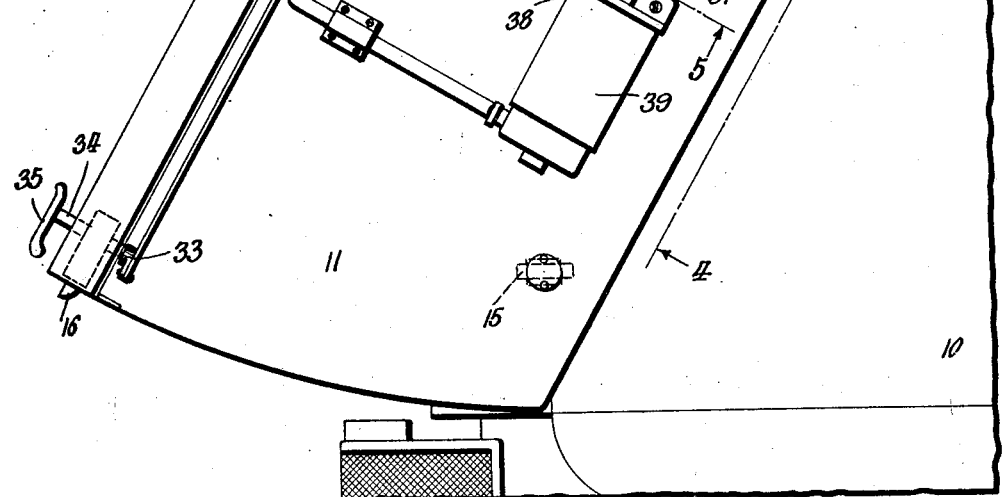
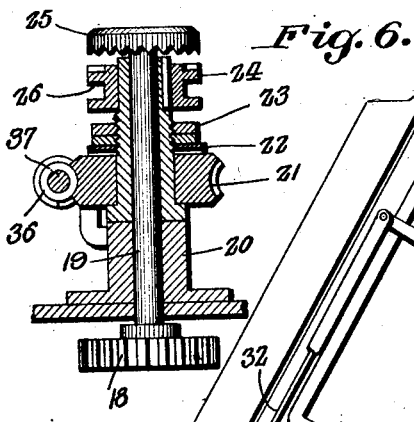
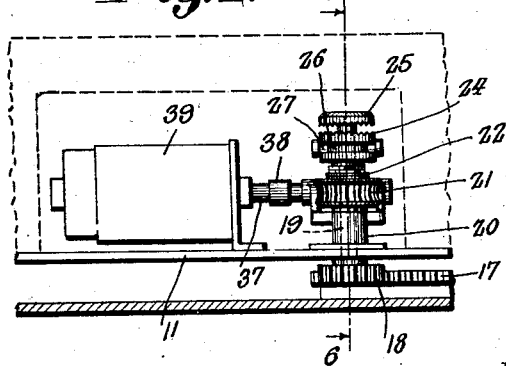
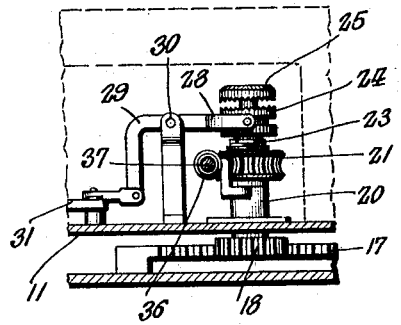
V. F. Hitt and J. O. Evans, INVENTOR
BY Victor J. Evans ATTORNEY Patented Mar. 17, 1931

1,797,144

UNITED STATES PATENT OFFICE

VERLINGTON F. HITT AND JOSEPH O. EVANS, OF MIAMI BEACH, FLORIDA

OPENING AND CLOSING DEVICE FOR RUMBLE SEATS

Application filed February 1, 1930. Serial No. 425,255.

This invention relates to improvements in vehicles and has especial relation to means for opening and closing the rumble seat of an automobile, an object being to provide means whereby the seat may be swung horizontally to an open position for convenience in entering the seat, and thereafter closed.

Another object of the invention is the provision of a power operated means for accomplishing the above, together with means whereby the occupants of the seat may control its operation.

Another object of the invention is the provision of means of the above character which will be rendered active through the operation of the seat latch, only as long as the latch is held in retracted position, so that in the event of the latch being released, movement of the seat will stop.

With the above and other objects in view, the invention further includes the following novel features and details of construction, to be hereinafter more fully described, illustrated in the accompanying drawings and pointed out in the appended claims.

In the drawings:—

Figure 1 is a fragmentary elevation showing a portion of an automobile provided with a rumble seat, the latter being in open position.

Figure 2 is a fragmentary top plan view of the same.

Figure 3 is an enlarged fragmentary view similar to Figure 2 with the seat cushion removed.

Figures 4 and 5 are sectional views taken respectively on the lines 4—4 and 5—5 of Figure 3.

Figure 6 is an enlarged fragmentary section taken on the line 6—6 of Figure 4.

Referring to the drawings in detail wherein like characters of reference denote corresponding parts, the reference character 10 indicates a portion of the body of an automobile, 11 a rumble seat, 12 a seat cushion and 13 the seat back, the latter forming a portion of the rear deck of the automobile when the seat is closed, as is usual in seats of this type.

The present invention is especially applicable to horizontally swinging seats which operate upon a pivot, the latter being indicated at 14, while a roller 15 positioned remote from the pivot 14 supports the seat in its horizontal movement.

Ordinarily, in seats of this character, the seat which is held in closed position by means of a spring latch 16, must be unlatched and manually pulled outward in order that persons might enter. The seat must thereafter be swung inward either by the occupants themselves, or others. In either event the closing operation is difficult.

In order to overcome these and other disadvantages, the present invention provides an arcuate rack 17 which is carried by the body 10 and which is engaged by a spur gear 18 carried by the seat 11. This gear is mounted upon a shaft 19 which extends upward through the bottom of the seat beneath the seat cushion 12. This shaft is housed within a sleeve 20 and rotatable upon this sleeve is a worm gear 21. The gear 21 has a frictional engagement with the sleeve 20 through the medium of a spring washer 22 and lock nuts 23 so that the latter may be adjusted to regulate the frictional engagement and permit slippage between the worm gear 21 and the sleeve.

The sleeve 20 is rotatable upon the shaft 19 and has splined thereon a clutch member 24 which is adapted to engage a clutch member 25 rigid with the end of the shaft 19. The clutch member 24 is provided with an annular groove 26 which receives studs 27 carried by a yoke 28. This yoke is carried by an L-shaped arm 29 and the latter is pivotally mounted as shown at 30.

The arm 29 is connected by means of a bell crank lever 31 with a rod 32, and the latter is connected to a crank arm 33 which is fast upon the inner end of the shank 34 of an operating handle 35 which controls the latch 16.

The gear 21 is engaged by a worm 36 which is mounted upon a shaft 37 operating in suitable bearings and this shaft is connected by means of a coupling 38 with the shaft of a motor 39, the latter being driven from the battery of the automobile and controlled by a suitable switch.

The motor 39 is preferably of the reversing type and may be controlled by a two-way switch, so that the direction of operation of the motor may be controlled and consequently the direction of rotation of the gears.

Assuming that the seat is closed, the handle 35 is operated to retract the latch 16 and release the seat. This operation from the handle 35, will move the clutch member 24 into engagement with the clutch member 25, so that when the motor switch (not shown) is closed, the motor will operate to drive the gear 18, and as the latter engages the rack 17, the seat will move outward. This movement will continue as long as the motor switch is closed and the latch 16 retracted. As soon as the handle 35 is released, the clutch member 24 will return to its normally disengaged position and outward movement of the seat will stop and the seat will remain at the point of such stoppage.

Occupants of the seat may operate the handle 35 to again engage the clutch, and after the motor switch has been operated to reverse the direction of operation of the motor, the seat will move inward to its closed position.

Should the foot of one of the occupants get caught by the moving seat, resistance of the closing movement of the seat will be set up and a slippage will occur between the worm gear 21 and the sleeve 20 so that the gear 21 will rotate upon this sleeve without driving the gear 18.

The invention is susceptible of various changes in its form, proportions and minor details of construction and the right is herein reserved to make such changes as properly fall within the scope of the appended claims.

Having described the invention what is claimed is:—

1. In combination with the body of a vehicle having a horizontally swinging rumble seat and a latch to hold the seat closed, motor driven gearing to move the seat horizontally to open or closed position, and means controlled by the operation of the latch to control the operation of the seat moving means.

2. In combination with the body of a vehicle having a horizontal swinging seat and a latch to hold the seat closed and provided with a latch operating means, a rack secured to the body, a shaft journalled to the seat, a gear connecting the shaft to the rack, a sleeve journalled on the shaft, a worm gear frictionally mounted on the sleeve for rotating the latter until a predetermined resistance is had thereto and adapted to then turn relative to said sleeve, a worm in mesh with the worm gear, a motor carried by the seat to rotate the worm, a clutch connected to the shaft and sleeve, and means connecting the clutch to the latch operating means for causing the clutch to connect the sleeve to the shaft when said means is operated to move the latch into releasing position and to cause the clutch to disconnect the sleeve from the shaft when said means is operated to position the latch in holding position.

In testimony whereof we affix our signatures.

VERLINGTON F. HITT.
JOSEPH O. EVANS.